Sept. 18, 1962 R. P. SCHOLFIELD 3,054,202

INDEX GUIDES AND TABS

Filed Sept. 14, 1961

INVENTOR

RICHARD P. SCHOLFIELD

BY Cushman, Darby & Cushman

ATTORNEYS 3,054,202
Patented Sept. 18, 1962

3,054,202

INDEX GUIDES AND TABS

Richard P. Scholfield, White Plains, N.Y., assignor to Wheeldex Manufacturing Co., Inc., Peekskill, N.Y., a corporation of New York Filed Sept. 14, 1961, Ser. No. 138,161
4 Claims. (Cl. 40—23)

This invention relates generally to an index tab and more particularly to a new and improved index tab which is pleasing in appearance, easily applied, and competitively priced.

The index tab means used heretofore were often large, clumsy, and unpleasing in appearance. They oftentimes dominated the information label, limiting its area and detracting the eye from adjacent tabs. Those of the Celluloid type produced a glare which often made reading difficult, and due to the thickness of the plastic employed in these tabs, the information written on the label was often distorted.

Their extremely limited size also necessarily forced crowding of the informative wording, and abbreviations were often essential. Furthermore, the old Celluloid type tabs were subject to cracking thereby creating dust catching corners, edges, and open tab ends. Such cracking also made it difficult for purposes of handling. Still another difficulty in the use of the Celluloid type tabs was their tendency to yellow with age.

Difficulty was also experienced in attempting to retain the label within the index tab which was designed in such a manner that the label would easily be inserted within the confines of the tab. Of course, a construction which allows ease of insertion, would usually tend to allow easy removal as well, even to the extent that the label would slip out inadvertently. Of necessity, the design was, at best, a compromise which necessarily resulted in a device which was only partially effective.

Filing space also is very much a concern of modern business people, and the old tabs consumed more space than necessary. The thickness of the main body of the filing guide or card is not the determining factor when calculating filing space consumed by the guide. Actually, the true measure lies in the dimension at the thickest point below the top of the associated cards or other material which the guides separate. This is usually found at the base of the tab and commonly measures between 50 and 75 points (thousandths of an inch) even with guides which have a thickness of only 20 points. Guides are thus caused to bulge at the top thereby requiring additional filing space; furthermore, this additional thickness at the top of the fileguide or card interferes with removal and insertion of adjacent records. While tabs have been used which require less space, these thinner types are subject to tearing and some of the other faults which have been previously pointed out.

Many filing systems today employ guides with heavy tabs on the top end which interfere with the ease of filing adjacent records, and which further add noticeably to the weight of the tray or drawer which may frequently require lifting.

In an effort to overcome the difficulties posed by the tabs used heretofore, I have developed the improved tab of the present invention. My tab is of lightweight construction, is attractive, and is not subject to cracking or discoloration. It is easily applied to guide cards, separators, index cards, or plain filing cards, but will not allow inadvertent separation of the information card therefrom. At the same time, the tab comprising the present invention may be readily removed and replaced, if desired. Furthermore, the index tab disclosed herein presents a clear, undistorted reading area which may be as large as the insert paper which it secures to the guide card and which might even extend below the exposed portion of the index card. There are no sharp edges to cut the fingers of the person applying the tabs, and the tab can be easily trimmed to any desirable width depending upon the size of the insert to be attached to the index card.

My tab comprises a generally rectangular sheet of transparent plastic material having one side completely coated with a layer of pressure sensitive adhesive. Only a portion of the opposite side of the transparent sheet is coated with the adhesive adjacent one end. That portion of the latter side of transparent sheet which is adhesively coated is applied to the upstanding portion of a suitable guide card such that the end of the sheet is aligned with the top edge of the guide card. A suitable insert label is pressed into engagement upon the completely coated side of the transparent sheet such that the top edge of the label is in alignment with the top edge of the guide card's upstanding portion. The downwardly extending portion of the transparent sheet is then folded about the lower edge of the insert label into engagement thereon, whereupon the sheet is again folded about the topmost edge of the guide card and pressed into engagement with the rear surface thereof.

Accordingly, it is an object of this invention to provide a new and improved index tab which is attractive, inexpensive, and easy to apply.

It is a further object of this invention to provide an index tab which will entirely surround the label to be attached to the filing guide or card in order to sealingly protect the same.

It is still a further object of this invention to provide an index tab which is light in weight, strong of construction, and which will not substantially add thickness to the filing guide.

It is yet a further object of this invention to provide an index tab or card of plastic material having a portion of a first surface adjacent one transverse edge coated with a layer of pressure sensitive adhesive and having a longer uncoated portion extending beyond the coated section to the opposite transverse edge, the sheet having its other surface continuously coated with a second layer of pressure sensitive adhesive from one transverse edge to the other.

Another object of this invention is the provision of an index tab of clear plastic material for use with a guide card, the index tab having a portion of a first surface coated with a layer of pressure sensitive adhesive for application to the guide card, and having its other surface continuously coated with a second layer of pressure sensitive adhesive such that upon application of a label thereon, the plastic material is adapted to be folded over onto the label, and further folded over a transverse edge of the guide card and pressed into sealing engagement with the opposite surface thereof.

Other objects and advantages will become apparent from the following description and the accompanying drawings in which.

Figures 1, 2, 3, 4, 5, 6, 7:
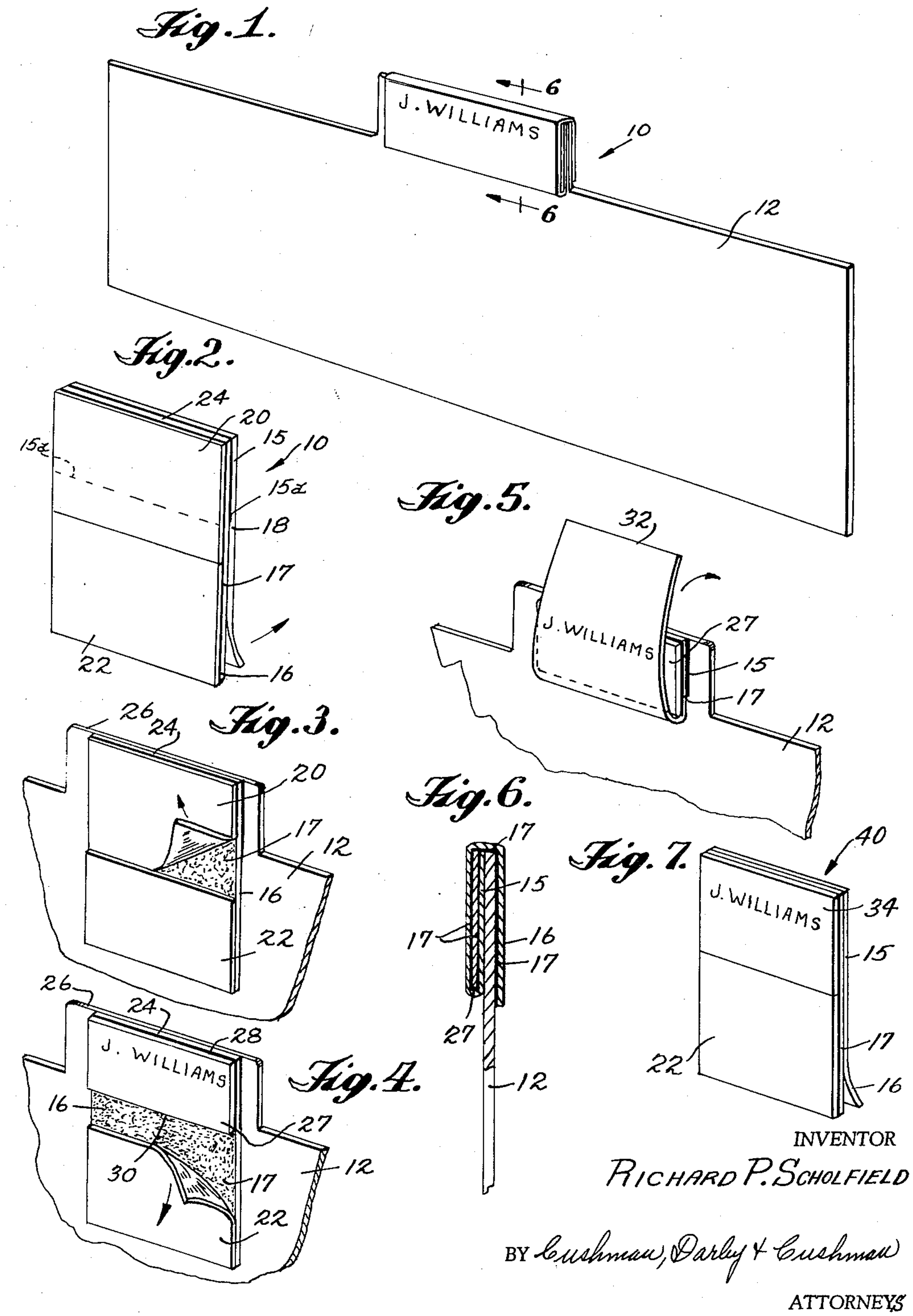
FIGURE 1 shows an index card or guide having applied thereto the tab means of the present invention.
FIGURE 2 is a perspective view showing one preferred assembly of elements in the form supplied by the manufacturer and adapted to be applied to a card or guide to provide the construction of the tab means as shown in FIGURE 1.
FIGURE 3 is a perspective view showing the tab means of FIGURE 2 in an intermediate stage of application to the index guide.
FIGURE 4 is a perspective view showing a subsequent step in the application of the assembly, with a label or card applied to the tab means.
FIGURE 5 shows yet a further step in the application of the tab means to the index guide.
FIGURE 6 is a sectional view taken along line 6—6 of FIGURE 1, showing the tab means of the present invention in its final position upon the index card; and, FIGURE 7 shows another modification of the assembly of elements which may be provided by the supplier with a card or label forming a part thereof, for application to guides or index cards by the user.

Referring now more particularly to the drawings, FIGURE 1 shows an index tab, generally at 10 which has been applied to the index guide 12.

The assembly or combination of parts from which the tab means 10 of FIGURE 1 may be made is more particularly illustrated in FIGURE 2. This comprises a main sheet 16 composed of relatively thin transparent plastic material such as cellophane, "Mylar," or the like, having a portion of its rear surface extending downwardly from the upper edge 24 coated with a layer of pressure sensitive adhesive. The adhesive 15 extends downwardly for approximately one-third of the length of the sheet 16, to a transverse line 15*a*. The adhesively coated portion on the rear face of the sheet 16 may generally correspond in size to that of an insert card or label subsequently to be applied. This layer of adhesive has a sheet of release paper 18 applied thereto. The release paper 18 which serves to protect the adhesive layer on the rear surface of the tab assembly adheres to the rear surface of the main sheet 16 only on that portion 15 which is coated with the adhesive, but is preferably of substantially the same shape and size as the main sheet.

The entire front surface of the main sheet 16, as viewed in FIGURE 2, is likewise coated with a layer of pressure sensitive adhesive as at 17 (see FIGURES 3, 4, and 6) to which is applied two sheets of release paper, 20 and 22. These sheets are of approximately the same size, although this is not critical in the construction of the index tab. FIGURE 2, therefore, generally illustrates the index tab assembly as it is distributed and prior to its application to a file guide or card 12.

For application to a suitable index guide, the release paper 18 is removed from the backsurface of the main sheet 16. The main sheet 16 with the sheets of release paper 20 and 22 which remain applied thereto is then laid onto the index guide 12 as shown in FIGURE 3 in such a manner that the top edge 24 of the index tab 10 is aligned with the top edge 26 of the index guide 12. At this point, the main sheet 16 is pressed into engagement with the index guide, the layer of pressure sensitive adhesive 15 serving as the bonding agent between them.

Thereupon, the release sheet 20 is removed from the main sheet 16. Indicia means 27, in the form of an index label or card having appropriate information written thereon, is then pressed into engagement upon the forward surface of the sheet 16, as seen in FIGURE 4, with its top edge 28 in alignment with the top edges 24 and 26 of the main sheet and the index guide, respectively.

At this point, the release sheet 22 is removed from the main sheet 16. The bottom portion of sheet 16 is folded about the bottom edge 30 of the label or card 27 and is pressed into sealing engagement thereover as indicated in FIGURE 5. The bottom portion 32 of the sheet 16 is then folded over the top edges 24, 26 and 28 of the label 27, sheet 16, and the index guide 12 respectively, the end thereof being pressed into sealing engagement with the back surface of the index guide.

It is contemplated that labels of varying lengths might be used with index tabs having a more or less standard size. Under certain circumstances, when using a label having a relatively short length, it is conceivable that when the bottom portion 32 of the main sheet 16 is lapped over the label and pressed thereon, a portion of sheet 16 having adhesive thereon might thereby become exposed. In order to prevent such an occurrence, the adhesive on the rear surface of the central member (as viewed in FIGURE 3) might be tinted an attractive color so as to locate the bottom adhesive line thereof. This would then provide a sharp line of differentiation between the adhesive surface and the non-adhesive surface of the rear side of central member 16. The bottom portion 32 of the label can then be aligned with this line of differentiation, and the label applied to the main sheet 16 in this position.

FIGURE 7 shows another modification of the index tab assembly of the present invention. In this instance, the tab assembly 40 is supplied with an index label 34 in place of release sheet 20.

The index label 34 may be pre-printed, or it may be unprinted and adapted to receive thereon any desired information. It may also be partially pre-printed and adapted to receive additional information thereon as desired. The "write-on" label 34 is supplied by the manufacturer and is accurately positioned with respect to the main sheet 16 relative to the adhesively coated portion thereof. The information to be placed on the label is preferably typed or written thereon prior to removal of the release sheets.

The tab assembly shown in FIGURE 7 includes the same elements as the embodiment of FIGURE 2 with the exception of release sheet 20. These include the main sheet 16, release sheets 18 and 22, and the adhesive layers at 15 and 17. The subsequent operations of applying the tab assembly 40, including the index label 34, to a guide 12 also remain the same as in the application of the first embodiment 10 of the index tab, with the exception of the step of removing the release sheet 20 from main sheet 16, since, in this modified embodiment, the index tab is supplied with the label 34 in place of the release sheet 20. This construction is desirable in that the application of an index tab with label 34 pre-mounted thereon results in a saving of time and effort which would otherwise be spent removing release sheet 20 from the main sheet 16 and applying label 27 thereto.

I have therefore described herein a new and improved index tab which is attractive, easy to use, and inexpensive. It avoids the difficulties presented by those index tabs which are currently in use, and can be easily adapted to file systems presently in use. Although it is easily applied, my tab will permit permanent attachment of an insert label to a guide card. At the same time, however, the tab can be deliberately removed and replaced if desired without impairing the guide card.

While the invention has been described in detail with specific examples, such examples are intended as illustrations only inasmuch as it will be apparent that there may be provided various modifications in the construction, arrangement, and general combination of elements and details disclosed without departing from the spirit and scope of the invention. The present embodiments are therefore to be taken in all respects as illustrative and not limiting, the scope of the invention being indicated by the appended claims rather than by the foregoing specification with all changes falling within the scope, means, and range of equivalency of the claims intended to be embraced therein.

What is claimed is:

1. An indexing tab comprising a sheet of clear plastic material having on a first surface adjacent one transverse edge, a section coated with a layer of pressure sensitive adhesive and a longer uncoated section extending beyond the coated section to the opposite transverse edge, said sheet having its other surface continuously coated with a second layer of pressure sensitive adhesive from one transverse edge to the other, whereby said first layer of adhesive may be secured to an index guide or the like adjacent an edge thereof and an indicia card or strip secured to the second layer of adhesive in the area on said other surface registering with the first layer of adhesive, the remaining length of the plastic sheet being adapted to be folded upon said indicia card or strip and secured thereto by the second layer of adhesive and to be folded over the edge of the indicia card and said edge of the index guide and secured to the opposite face of the latter by the second layer of adhesive.

2. An indexing tab comprising a sheet of clear plastic material having on a first surface adjacent one transverse edge, a section coated with a layer of pressure sensitive adhesive and a larger uncoated section extending beyond the coated section to the opposite transverse edge, said sheet having label means mounted on its other surface in coextensive relationship with said adhesive layer, the remainder of said other surface being coated with a second layer of adhesive extending from said label means to the opposite transverse edge thereof.

3. In combination with index guide means, an index tab comprising a sheet of clear plastic material having on a first surface adjacent a first transverse edge, a section coated with a first layer of pressure sensitive adhesive for application to said guide means adjacent an edge thereof, and a larger uncoated section extending beyond the coated section to the opposite transverse edge, said sheet having its other surface continuously coated with a second layer of pressure sensitive adhesive from one transverse edge to the other, label means of sheet material pressed into engagement with said second layer of adhesive adjacent said first transverse edge, said plastic material adapted to be folded about a transverse edge of said label means and pressed into sealing engagement therewith and further folded about an edge of said guide means and pressed into sealing engagement on the opposite side thereof.

4. In combination with index guide means, an index tab comprising a sheet of clear plastic material having on a first surface adjacent a first transverse edge a section coated with a first layer of pressure sensitive adhesive applied to said guide means adjacent an edge thereof, and a longer uncoated section extending beyond the coated section to the opposite transverse edge, said sheet having label means mounted on its other surface in coextensive relationship with said adhesive layer, the remainder of said other surface being coated with a second layer of adhesive extending from said label means to the opposite transverse edge thereof, said plastic material being folded about a transverse edge of said label means and pressed into sealing engagement therewith and further folded about an edge of said guide means and pressed into sealing engagement on the opposite surface thereof.

References Cited in the file of this patent

UNITED STATES PATENTS

| | | |
|---|---|---|
| 2,089,333 | Bourdon | Aug. 10, 1937 |
| 2,164,928 | Krueger | July 4, 1939 |
| 3,001,306 | Wilkinson | Sept. 26, 1961 |